United States Patent [19]

Burgess

[11] Patent Number: 4,668,251
[45] Date of Patent: May 26, 1987

[54] MUD PUMP DEGASSING AND SUPERCHARGING APPARATUS

[75] Inventor: Harry L. Burgess, Houston, Tex.

[73] Assignee: Burgess & Associates Mfg., Inc., Houston, Tex.

[21] Appl. No.: 800,515

[22] Filed: Nov. 21, 1985

[51] Int. Cl.$^4$ ............................................. B01D 19/00
[52] U.S. Cl. ...................................... 55/190; 55/199; 55/213
[58] Field of Search ...................... 55/41, 55, 189–193, 55/199, 184, 213

[56] References Cited

U.S. PATENT DOCUMENTS

| | | | |
|---|---|---|---|
| 3,616,599 | 11/1971 | Burnham | 55/41 |
| 3,973,930 | 8/1976 | Burgess | 55/41 |
| 4,084,946 | 4/1978 | Burgess | 55/189 X |
| 4,088,457 | 5/1978 | Phillips et al. | 55/199 X |
| 4,365,977 | 12/1982 | Egbert | 55/41 |

Primary Examiner—Charles Hart
Attorney, Agent, or Firm—Carl G. Ries

[57] ABSTRACT

A modified drilling mud degasser is used to simultaneously degas drilling mud delivered thereto from a mud tank and to supercharge a mud pump to which the degassed mud is delivered. This is accomplished through the provision of a drilling mud degasser and supercharger comprising power driven degassing means for removing gas from drilling mud delivered thereto and pump means for delivering degassed drilling mud therefrom to said mud pump at a predetermined pump supercharging pressure, and means for recirculating drilling mud from the drilling mud degasser and supercharger to the mud tank when the mud pump is not operating.

4 Claims, 1 Drawing Figure

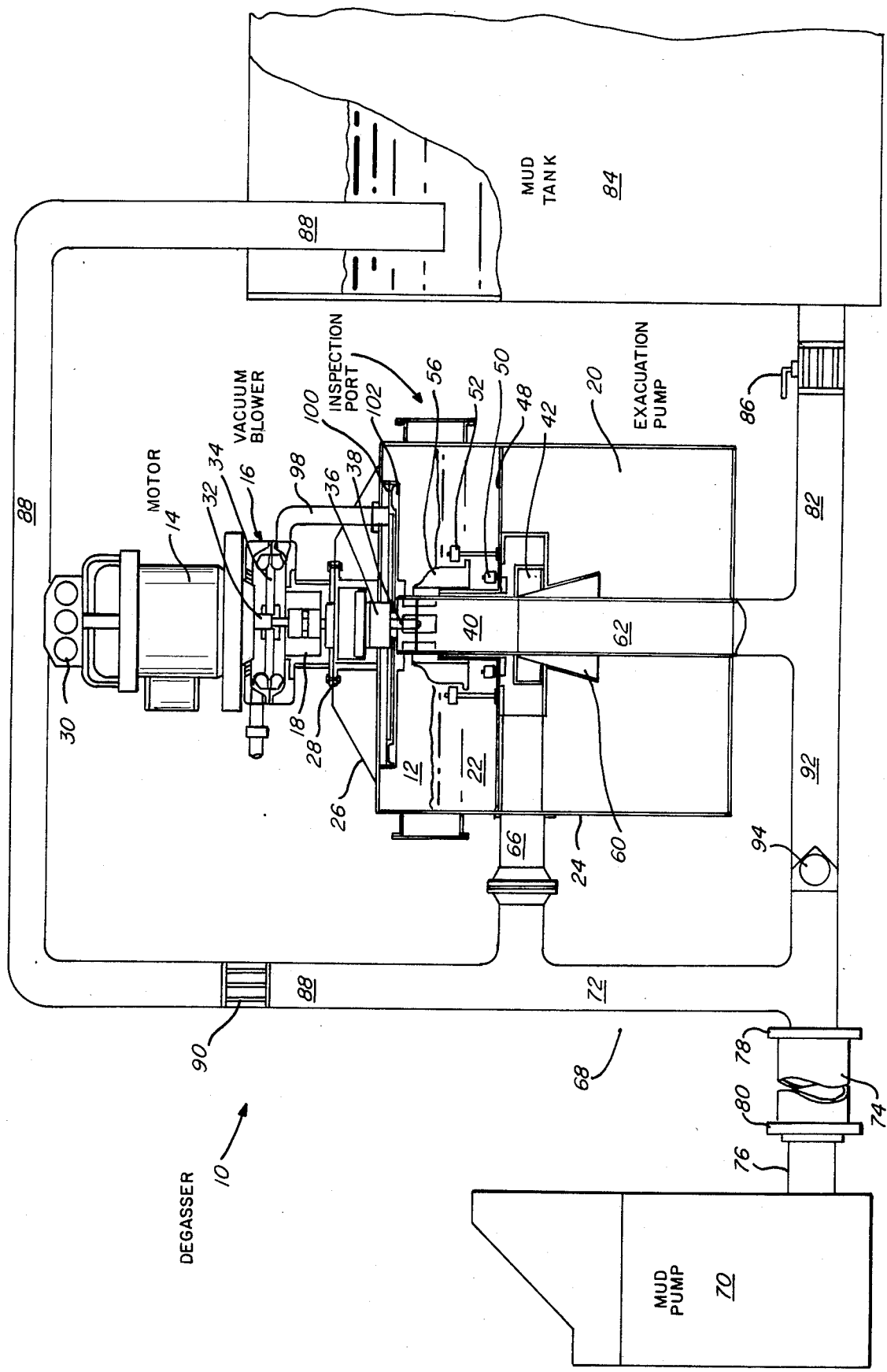

MUD PUMP DEGASSING AND SUPERCHARGING APPARATUS

TECHNICAL FIELD OF THE INVENTION

This invention relates to apparatus useful in connection with the drilling of wells, such as oil wells, wherein a mud pump is used to circulate drilling mud under pressure through a drill string, down to and around the drill bit and out the annulus of the bore hole of the well to a mud reservoir; the apparatus of the present invention being useful for simultaneously degassing drilling mud and supercharging the mud pump.

DESCRIPTION OF THE PRIOR ART

In the drilling of deep wells, such as oil wells, it is common practice to penetrate the earth with a drill bit supported on a drill string in the bore of the well being drilled. In order to lubricate the drill bit, protect the well against blowouts, etc., it is conventional practice to circulate mud under pressure through the drill string down to and around the drill bit and up the annulus between the drill string and the bore of the well. Mud flowing from the well is passed through a suitable device such as a shaker, etc., in order to remove drill cuttings, etc., and is then delivered to a mud reservoir, such as a mud tank, for recirculation to the mud pump for pressured injection into the well.

It is also conventional practice to use a mud pump, such as a duplex or triplex mud pump comprising reciprocating pistons mounted in cylinders for pressuring the incoming drilling mud and delivering it to the well bore under pressure. The operation and construction of mud pumps is well known to those of ordinary skill in the art, as illustrated, for example, by the textbook "Mud Pump Handbook" by Samuel L. Collier (Gulf Publishing Company, Houston, Tex., 1983).

It is known, as explained in the Collier handbook, that the efficiency of a mud pump can be significantly improved by supercharging the pump; that is, by delivering drilling mud under pressure to the mud pump inlet to the cylinders containing the reciprocating pumping pistons.

It is also known to remove occluded gasses such as air, methane, etc., from drilling mud before it is delivered to the mud pump as illustrated, for example, by Burgess U.S. Pat. No. 3,973,930, Burgess U.S. Pat. No. 3,999,965 and Burgess U.S. Pat. No. 4,084,946. The present invention is uniquely adapted for use in connection with a drilling mud degassing device of the type shown in the said Burgess patents.

Other drilling mud degassing devices are known to the art, such as those disclosed in Phillips et al. U.S. Pat. No. 4,088,457, Brown et al. U.S. Pat. No. 4,113,452, Egbert U.S. Pat. No. 4,365,977, Gowan et al. U.S. Pat. No. 4,397,659, etc.

BACKGROUND OF THE INVENTION

Mud pumps used for delivering drilling mud under pressure to the bore hole of a well are conventionally of the type wherein a reciprocating piston in a cylinder is used to pressure drilling mud delivered to the cylinder for delivery to the well bore. Normally, two or three such cylinders are used, such pumps being conventionally referred to as duplex and triplex pumps. During each stroke of the piston, the piston is initially accelerated by an appropriate drive means, such as a crank shaft, from a starting position to a midcylinder position, and then decelerated to a final position within the cylinder. This constantly changing rate of motion of a reciprocating piston can result in knocking, cavitation, etc., all of which impair the efficiency of the pump. It is known to use centrifugal pumps, commonly known as superchargers, in order to deliver drilling mud to the inlet of the cylinder under pressure in order to alleviate such problems and improve the efficiency of operation of the pump.

It is undesirable to recirculate drilling mud containing occluded gases to a well bore, and therefore it is common practice to remove a significant portion of occluded gas from the drilling mud before it is recirculated to the mud pump. Normally, separate pieces of equipment that operate independently of each other are used for supercharging the mud pump and for degassing the drilling mud.

SUMMARY OF THE INVENTION

It has been discovered in accordance with the present invention that a drilling mud degasser of the type disclosed in the Burgess patents can be modified to simultaneously degas drilling mud and to supercharge the mud pump to which the degassed mud is to be delivered.

This is accomplished in accordance with the present invention through the provision of a device for simultaneously supercharging a mud pump having pistons reciprocably mounted in cylinders while degassing drilling mud to be delivered to said pistons comprising:

vacuum chamber means for continuously accelerating and centrifuging drilling mud under vacuum to thereby substantially completely remove occluded gas from the drilling mud, pump means for delivering degassed drilling mud under pressure from said vacuum chamber, a first conduit interconnecting said vacuum chamber with a drilling mud reservoir for delivering drilling mud to be degassed to said vacuum chamber means, a second conduit for delivering degassed drilling mud from said pump means to the inlet of a mud pump, a first valve controlled branch conduit interconnecting said second conduit with said drilling mud reservoir for delivering drilling mud to said drilling mud reservoir when the pressure in said second conduit exceeds a predetermined value, and a second branch conduit containing normally closed flow control means interconnecting said second conduit with said first conduit and said drilling mud reservoir operable on loss of pressure in said second conduit to permit flow of drilling mud directly from said drilling mud reservoir to said second conduit.

BRIEF DESCRIPTION OF THE DRAWING

In the accompanying drawing, the FIGURE is a schematic elevation view, with parts broken away, showing a preferred embodiment of the present invention.

DESCRIPTION OF THE PREFERRED EMBODIMENT

Referring now to the drawing, there is shown a supercharging drilling mud degasser 10 of the present invention which comprises a degassing chamber designated generally by the number 12, a power source such as an electric powered motor or a hydraulically powered motor designated generally by the number 14, a vacuum blower such as a regenerative vacuum blower, designated generally by the number 16, a gear box designated generally by the number 18, an evacuation pump designated generally by the number 20 and a drilling mud chamber designated generally by the number 22.

In accordance with this construction, there is provided a drilling mud degasser of the type shown in Burgess U.S. Pat. No. 4,084,946, housed in a cylindrical pressure vessel 24. The motor 14 is supported on vacuum blower 16 which, in turn, is supported by vacuum motor support 26 and vacuum blower brackets 28. To facilitate movement of the degasser 10, motor handling brackets 30 may be provided on the top of the motor 14 to which the hook of a crane or other appropriate means (not shown) may be attached.

A drive shaft 32 extends from the motor 14 into driving engagement with vacuum blower impeller 34 and thence into driving engagement with the gear box 18 containing appropriate reduction gears (not shown).

A foam separation impeller 36 is rotatably secured to a gear shaft 38 depending from and operatively connecting the gear box 18, the gear shaft 38 being also operatively rotatably secured to the top of a rotating slotted centrifuge tube 40. With this construction, the vacuum blower 16 can be operated at an appropriate speed necessary for the generation of a vacuum of from about 10 to 15 inches of mercury while the foam separator impeller 36 and the slotted centrifuge tube 40 may be rotated at a different and more appropriate slower rate.

Drilling mud pump impeller 42 is fixed to the centrifuge tube 40 for rotation therewith within the housing 46 of drilling mud evacuation pump 20. Cross braces 48 mounted in the cylindrical vessel 24 support lower stops 50 and upper stops 52 for an annular float 56 that surrounds the slots of the centrifuge tube 40 and partially closes them, such that the free area of the slots will be determined by the relative position of the annular float 56.

A drilling mud inlet 60 is connected to the bottom of the housing 46 for the evacuation pump 20 for the delivery of degassed drilling mud thereto. Drilling mud is delivered to the slotted centrifuge tube 40 by an inlet conduit 62 which preferably terminates inside the housing 46 for the evacuation pump 20. The top of the inlet line 62 is spaced from the bottom of the slotted centrifuge tube 40 so that the rotating centrifuge tube 40 can rotate freely without bearing upon the top of the inlet line 62. The resultant "controlled seepage" of fluid from the inlet tube 62 into the evacuation pump 20 provides a low pressure area for high effeciency scanvenging of occluded gases. Also, there is no need for bearings and seals at the bottom of the slotted centrifuge tube 40.

With this construction there is also provided an outlet line or conduit 66 connected with the discharge side of the evacuation pump 20 and extending through the wall of the cylinder 24 for connection with a suitable first conduit 68 leading, for example, to a triplex pump 70 for injecting drilling mud under pressure into a well penetrating a subterranean formation in order to lubricate the drill bit, protect the well against blow outs, etc., it is conventional practice to circulate mud under pressure through the drill string down to and around the drill bit and up the annulus beteen the drill string and the bore of the well. Mud flowing from the well is passed through a suitable device such as a shaker, etc. (not shown) in order to remove drill cuttings, etc., and is then delivered to a mud reservoir, such as a mud tank 84, for recirculation to the mud pump 70 in the manner described herein for pressured injection into the well.

The first conduit 68 may comprise, for example, a connecting pipe 72 interconnecting the outlet line 66 with the flexible hose 74 which, in turn, is connected to a mud pump inlet line 76. The flexible hose 74, which is provided for ease in alignment, may be secured to the connecting pipe 72 by a clamp 78 of any suitable construction and to the mud pump inlet line 76 by a clamp 80 of any suitable construction.

A second conduit 82 interconnects a drilling mud reservoir such as a mud tank 84 with the inlet conduit 62 leading to the slotted centrifuge tube 40 for the degasser 10.

Preferably, the second conduit 82 is provided with valve means such as a butterfly valve 86 which may be used to close the second conduit 82 when both the drilling mud degasser 10 and the mud pump 70 are to be idled for any appreciable time.

A first branch conduit 88 interconnects the first conduit 68 with the mud tank 84 and contains pressure sensitive control means such as a spring biased relief valve 90 in order to permit drilling mud to recycle from the first conduit 68 to the mud tank 84 when the pressure in the first conduit 68 exceeds a predetermined value.

A second branch conduit 92 interconnects the first conduit 68 with the inlet conduit 62 and the second conduit 82. The second branch conduit 92 contains normally closed flow control means such as a check valve 94 to permit flow of drilling mud directly from the mud tank 84 to the mud pump 70 if the pressure in the first conduit 68 falls below a predetermined value.

OPERATION OF THE PREFERRED EMBODIMENT

During drilling operations, rotation of an appropriate vacuum blower such as a regenerative vacuum blower by the drive shaft 32 for the motor 14 will generate a vacuum in the degassing chamber 12 such that drilling mud sprayed from the slots in the centrifuge tube 40 will tend to impact upon the inner sides of the degassing chamber 12 thereby initiating degassing of the drilling mud fed through the inlet line 62. Rotation of the centrifuge tube 40 will impart upward accelerating rotary motion to partially degassed drilling mud delivered thereto through the line 62 and the resultant spraying of the thus centrifuged drilling mud through the slots in the centrifuge tube 40 will result in a sheet of drilling mud being sprayed onto and impacting on the inner walls of the degassing chamber 12 to thus substantially complete the removal of gas from the drilling mud. The thus degassed drilling mud will flow downwardly past cross braces 48 and into inlet 60 leading through the housing 46 of the evacuation pump 20 where the impeller 42 will repressure the now degassed drilling mud for discharge through the outlet line 66 which is interconnected with a triplex pump 70 by first conduit 68 for supercharging the pump 70, which further pressures the degassed drilling mud for injection into a well bore penetrating a subterranean formation.

In order to prevent the entrainment of drilling mud droplets in the gases withdrawn through the gas evacuation suction pipe 98, a splatter plate 100 is provided in the degassing chamber 12 and a combination of a foam separation impeller 36 with a splatter disk 102 is provided adjacent the top of the degassing chamber 12 so that gas liberated in the vacuum chamber must follow a sinuous path arriving at the upper chamber gas evacuation suction pipe 98.

In accordance with the present invention, the motor 14 is operated such that drilling mud delivered to the first conduit 68 will be at a predetermined appropriate supercharging pressure for the mud pump 70, (e.g. a pressure of about 20 to 30 psig).

The pressure sensitive control means, such as a spring biased relief valve 90, is set to open at a predetermined pressure about 5 to 10 psi higher than the desired pressure in the first conduit 68 so that, if the indicated pressure limit is exceeded, the pressure relief valve 90 will open in order to permit drilling mud to recycle to the mud tank 84.

This will happen if the mud pump 70 malfunctions and also when the mud pump 70 is turned off, as will happen from time to time. For example, it is necessary to turn off the mud pump 70 during drilling operations when a new stand of drill pipe is to be added to the drill string. It is also necessary to turn off the mud pump 70 when the drill string is being withdrawn from the well bore in order to replace the drill bit, while well logging operations are in progress, if it is necessary to "fish" for a piece of equipment lost down the hole, etc. However, if the drilling mud in the mud tank 84 is permitted to remain quiescent for more than a limited period of time, the drilling mud may start to gel and/or to stratify. This problem is conventionally avoided by providing a separate agitator (not shown) for the mud tank 84 in order to stir the drilling mud when the mud pump 70 is idle. However, through the provision of the present invention, there is no need for a separate agitator for the mud tank 84 because recirculation of drilling mud through the first branch conduit 88 will impart a "roiling" motion or agitation to the drilling mud in mud tank 84 to inhibit gelling and/or stratification of the drilling mud while the mud pump 70 is idle.

The normally closed flow control means (e.g., check valve 94) in the second branch conduit 92 may suitably be a simple check valve such that the second branch conduit will remain closed so long as there is pressure in the first conduit 68. Alternately, the check valve 94 may be a spring biased check valve preset so that the valve 94 will open if the pressure in the first conduit 68 drops to a predetermined low value such as 10 psig.

Loss of pressure in the first conduit 68 can occur in the event of malfunction of the degasser 10 or in the event it is desired to shut the degasser 10 down for a limited period of time. In this event, drilling mud flows directly from the mud tank 84 through the second conduit 82, the second branch conduit 92 and the flexible hose 74 to the mud pump 70 so that the mud pum 70 is not "starved" for drilling mud to be injected into the well.

Having thus described my invention, what is claimed is:

1. A drilling mud degasser and circulator for simultaneously degassing drilling mud delivered thereto from a mud tank and for delivering degassed drilling mud therefrom to a mud pump having reciprocating pistons at a supercharging pressure comprising:

power driven degassing means for removing gas from said incoming drilling mud including pump means for delivering degassed drilling mud to said mud pump at a predetermined pump supercharging pressure during operation of said mud pump, said power driven degassing means including vacuum chamber means for continuously accelerating and centrifuging drilling mud under vacuum and for spraying the thus-accelerated and centrifuged drilling mud in order to remove occluded gases therefrom, a first conduit interconnecting the drilling mud outlet of said vacuum chamber means with said mud pump for said delivery of degassed drilling mud thereto under pressure to supercharge said mud pump, second conduit means interconnecting said vacuum chamber means with mud tank for delivering drilling mud to be degassed to said vacuum chamber means, a first branched conduit containing normally closed pressure sensitive control means for recycling drilling mud from said pump means to said mud tank if the pressure in said first conduit exceeds a predetermined value, and a second branched conduit containing normally closed flow control means interconnecting said mud tank with said mud pump for operably interconnecting said mud tank directly with said mud pump if pressure in said first conduit decreases below a predetermined level.

2. An apparatus as in claim 1 wherein the normally closed pressure sensitive control means in said first branched conduit is a spring biased relief valve.

3. An apparatus as in claim 2 wherein the normally closed flow control means in said second branched conduit is a check valve.

4. An apparatus as in claim 3 wherein said second conduit contains normally open valve means for closing said second conduit.

* * * * *